United States Patent [19]

Pollin

[11] 4,010,631
[45] Mar. 8, 1977

[54] METHOD AND APPARATUS FOR PULSE SHAPING IN BALLISTIC SIMULATORS

[75] Inventor: Irvin Pollin, Bethesda, Md.

[73] Assignee: The United States of America as represented by the Secretary of the Army, Washington, D.C.

[22] Filed: Sept. 9, 1975

[21] Appl. No.: 611,776

[52] U.S. Cl. .................................. 73/12; 73/167
[51] Int. Cl.² .................................. G01M 7/00
[58] Field of Search .............. 73/12, 167, 35; 188/1 C

[56] References Cited

UNITED STATES PATENTS

| 2,445,307 | 7/1948 | Mindlin | 73/12 |
|---|---|---|---|
| 2,454,793 | 11/1948 | Grogan et al. | 73/167 X |
| 2,455,356 | 12/1948 | Crede | 73/12 X |
| 2,740,286 | 4/1956 | DeVost | 73/12 |
| 3,024,652 | 3/1962 | Bross | 73/167 |
| 3,552,525 | 1/1971 | Schudel | 73/12 |
| 3,597,969 | 8/1971 | Curchak | 73/167 |
| R27,073 | 2/1971 | Schimmel et al. | 73/35 |

*Primary Examiner*—S. Clement Swisher
*Attorney, Agent, or Firm*—Nathan Edelberg; Robert P. Gibson; Saul Elbaum

[57] ABSTRACT

A ballistic simulation system including means to shape the deceleration pulse by varying the rate of energy transfer in the system, including a shaped crush-surface on the mitigator and a momentum-exchange member having an elastic portion.

6 Claims, 9 Drawing Figures

METHOD AND APPARATUS FOR PULSE SHAPING IN BALLISTIC SIMULATORS

The invention described herein may be manufactured, used, and licensed by or for the U.S. Government for governmental purposes without the payment to me of any royalty thereon.

BACKGROUND OF THE INVENTION

The present invention relates to the testing of kinetic forces and is concerned, more particularly, with the simulation of acceleration forces on projectiles and their components.

BRIEF DISCUSSION OF THE PRIOR ART

The testing of components for use in projectiles includes simulation of accelerative forces under conditions in which the forces can be accurately measured and modified to reproduce the actual forces, and force changes, to be experienced by the projectile in actual service.

For example, the ruggedness and reliability of components, such as an artillery fuze, generally cannot be qualitatively, quantitatively, or comparatively evaluated except under conditions which simulate their flight experience without the terminal destruction which would be experienced in actual flight and impact.

A preferred method of simulating the forces to be experienced by a projectile and its components has been that of an "airgun" accelerating a projectile, by air pressure and in a confined tube of appropriate diameter, and then decelerating the projectile at a reproducible rate simulating the conditions to be experienced in actual use. This deceleration has been accomplished by impacting the projectile against an opposing, momentum-exchange mass with a deformable velocity mitigator assuming the kinetic load between the two.

Prior mitigators have been formed of different materials to provide differing deceleration rates and, therefore, have required the stocking of a variety of different materials to afford the requisite variety in projectile experience.

In addition, the use of pure mass forms of momentum-exchange masses has been a limiting factor and has made it necessary for prior mitigators to provide the entire profile of projectile experience, since the mitigator was the sole variable in the rate of exchange of momentum between the projectile and the momentum-exchange mass.

Although such variables as the projectile weight, the projectile velocity at impact and the weight of the momentum-exchange mass may be varied to provide some changes in projectile experience in the ballistic simulating system, the mitigator composition has, therefore, been a principal variable by which the projectile experience could be regulated.

Therefore, prior ballistic simulators and components have not been found to be entirely satisfactory,

SUMMARY OF THE INVENTION

In general, the preferred ballistic simulating system of the invention includes an airgun for impacting a projectile upon a momentum-exchange mass with a deformable mitigator interposed therebetween, the shape of the deforming area being modified along its axis of deformation to provide a varying rate of deforming resistance. Preferably, the momentum-exchange mass includes an elastic means for storing impact energy for subsequent release to the projectile.

OBJECTS OF THE INVENTION

An object of the present invention is the provision of a ballistic simulation system which is accurate and reliable.

A further object of the present invention is the provision of a ballistic simulation system employing mitigators which are shaped in their crush zone to provide variable deceleration profiles.

Another object of the present invention is the provision of a ballistic simulation system employing mitigators having variable cross-sectional areas along their crush zone to provide variable crushing resistance along their length.

It is another object of the present invention to provide a ballistic simulation system employing resilient energy-storing means in its momentum-exchange mass.

It is a still further object of the present invention to provide a ballistic simulation system employing resilient energy-accumulting means in its momentum-exchange mass and a mitigator having a varied cross-sectional area in its crushing zone.

BRIEF DESCRIPTION OF THE DRAWINGS

These and other objects of the invention and a better understanding thereof may be derived from the following description and the accompanying drawings, in which.

DETAILED DESCRIPTION OF THE PREFERRED SYSTEM

As shown schematically in FIGS. 1 and 2, a form of ballistic simulation system according to the invention includes a tube T enclosing a flat-faced projectile P, a mitigator M mounted on the projectile and a momentum-exchange member, identified by and hereinafter referred to as MEM, suitably mounted opposite one end of the tube.

The MEM includes first and second portions 1 and 2, respectively, which are separated by a resilient portion 3 mounted therebetween.

The mitigator M includes a cylindrical body 4 having a shaped crushing zone or face 5 in the form of a cone having a base diameter $d$, a length $l$ and an interior angle $a$.

Suitable airflow means, such as the vacuum source V, communicates with the interior of the tube T near the end thereof which is adjacent to the MEM. The tube is open at its end adjacent to the projectile and is sealed, at its opposite end, by suitable means such as a thin, rupturable diaphragm seal shown schematically at 6.

OPERATION OF THE PREFERRED SYSTEM

Figure 1:
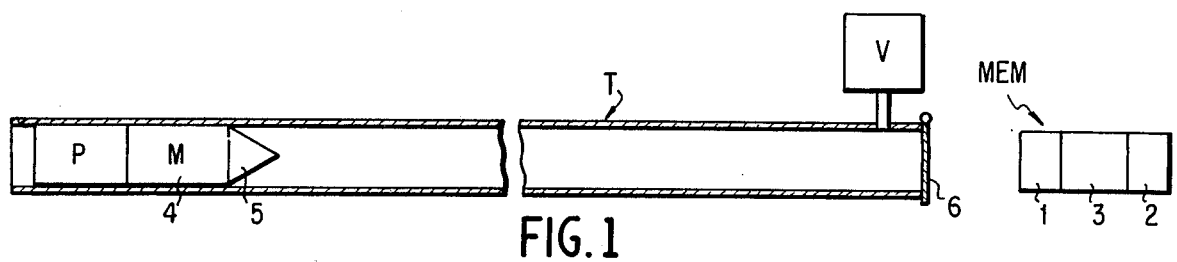
FIG. 1 is a schematic diagram of a ballistic simulator embodying the invention.

In operation of the system of FIG. 1, the tube T is subjected to a vacuum via the source V, the diaphragm seal 6 in place. Upon release of the combined projectile P and mitigator M such as by means of a release pin, atmospheric pressure gradually accelerates the projectile and mitigator, toward the stationary MEM. The diaphragm seal is ruptured by impact with the mitigator.

Upon emergence and impact with the MEM, the energy of the system is consumed partly by crushing of the zone 5 of the mitigator M and partly by displacement of the MEM and energy storage in the resilient portion 3 of the MEM. After the projectile P, mitigator M and the MEM achieve equal speed, crushing of the mitigator ceases and the energy stored in the resilient portion is released against the first and second portions, 1 and 2, of the MEM. The first section 1 then thrusts against the mitigator M, further decelerating the projectile and mitigator and tending to separate the MEM therefrom.

The resilient portion of the MEM therefore acts to prolong the time period during which the momemtum of the system is transferred to the MEM, and serves as a means for varying the rate of momentum transfer in the system.

Figure 2:
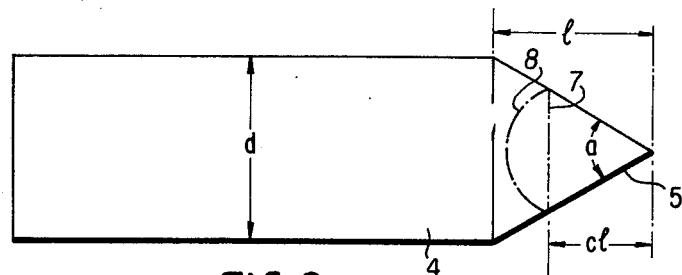
FIG. 2 is a schematic view of a crushable mitigator showing the principle of a variable-area crushing zone.

Similarly, as best understood with reference to FIG. 2, the shaped crushing zone 5 of the mitigator serves to vary the forces acting between the projectile and the MEM. As the zone 5 is progressively crushed longitudinally by the projectile along the distance $cl$, the diameter of the mitigator material which is exposed to the projectile and, therefore available to resist the crushing force, increases at a uniform rate per unit of mitigator length. The decelerating force or pulse experienced by the projectile and its components is, therefore, a smooth, uniformly-increasing force which crushes the mitigator material into a zone schematically represented by dot-dash lines in FIG. 2, the flat face of the projectile having formed a flat face 7 on the crushed zone. The mitigator material interior of and behind the flat face 7 is crushed in a convex zone 8 away from the face 7.

It should be noted that the crush zone is shown schematically in FIG. 2 and that the zone there represented is merely exemplary. Accordingly, it should be understood that the crush zone may extend deeper into the mitigator than is shown in the drawing, depending upon the momentum encountered and the rate of crushing of the mitigator material. Also, differing shapes of mitigators may create different crush zone shapes.

Modification of decelerating pulse may be achieved, for the same mitigator material, by modifying the shape of the crush interface 5. Therefore, if a given angle $a$ is found to give too low a rate of deceleration, the angle may be steepened to provide a higher rate in a subsequent mitigator.

When the proper shape of mitigator for the desired deceleration pulse is found, projectile components can then be tested by being subjected to the acceleration forces they would experience in the weapon for which they are intended.

For example, a fuze may be mounted backward in a test projectile P and mitigator M of appropriate weights to provide a setback acceleration pulse equivalent to that of an actual projectile. The selected pulse imposed on the projectile by the MEM and mitigator M then simulates the acceleration pulse to which the fuze would be subjected upon firing from the artillery piece for which it was designed.

Modification of the shape of the crush face of the mitigator may be sufficient to provide the requisite setback acceleration pulse with non-resilient MEM's, for a given test, but it has been found that the combination of a shaped mitigator with MEM's having resilient portions is particularly advantageous in that smoother pulse shapes and longer pulse falls can be obtained.

Figure 9:
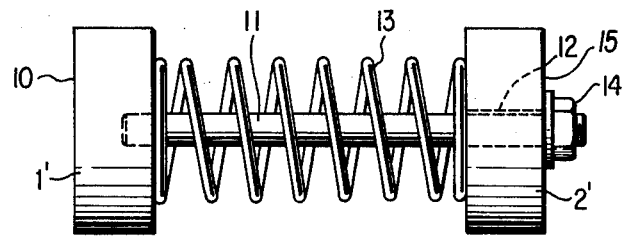
FIG. 9 is a side view of the preferred form of the momentum-exchange member of the invention.

The preferred form of MEM is shown in FIG. 9 and includes a first portion 1' having an impact face 10. The first portion mounts a bolt 11 which extends through an aperture 12 in a second portion 2'. The first and second mitigator portions are separated by a stock-item railroad-locomotive, disc-type spring (shown schematically at 13) and are limited in their separation by a nut 14 or similar assembly engaging the bolt 11 and the outer face 15 of the second portion. The longitudinal compression rate of the MEM may be modified as desired by the substitution of different springs of differing rates and the use of different masses 1 and 2, according to the desired rate of momentum exchange.

Various configurations and shapes of mitigators may be used, with the same mitigator material, to provide a wide variety of deceleration pulses, including non-uniform pulses, as represented in FIGS. 3 through 8.

Figure 3:
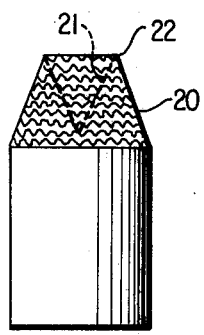
FIG. 3 is a side view of a preferred form of mitigator having a crushing zone with a frusto-conical exterior and a conical hollow therein.
Figure 4:
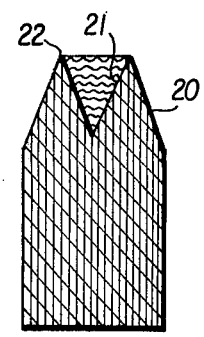
FIG. 4 is a sectional side view of the preferred mitigator.

FIGS. 3 shows the preferred form of a mitigator which includes a shaped face in the form of a hollow, frustrated cone having an outer taper 20 and a coaxial, conical hollow 21. The intersection of the taper 20 and the hollow 21 presents an annular ridge 22 on the crushing face. In this case, because the inner and outer tapers are equal, this annulus increases and the corresponding crush area increases linearly with the distance of penetration by the bird of MEM until the crush reaches the end of the tapers. Thereafter, the crush area is a maximum and remains constant.

Figure 5:
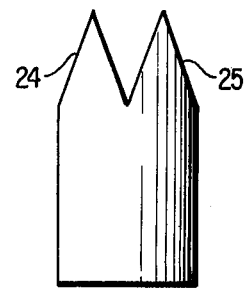
FIG. 5 is a side view of a modified form of a mitigator having a crush zone formed of two wedges.
Figure 6:
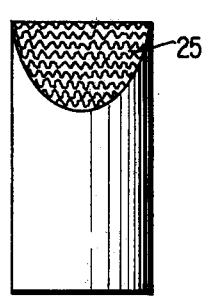
FIG. 6 is a side view taken from the right-hand side of FIG. 5.

Variations of crush area can also be accomplished by forming the double-wedge and triple-wedge mitigators shown in FIGS. 5, 6, 7 and 8, respectively. In the mitigator of FIGS. 5 and 6, the double-wedge crush area increases approximately linearly with the crush distance.

Figure 7:
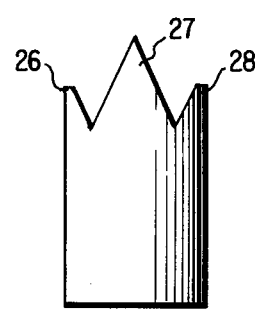
FIG. 7 is a side view of a modified form of a mitigator having a crush zone formed of three wedges of differing length.
Figure 8:
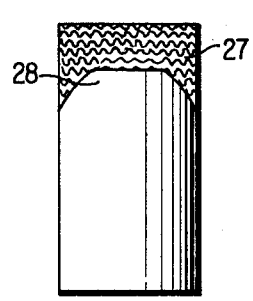
FIG. 8 is a side view taken from the right-hand side of FIG. 7.

In use, the mitigator of FIGS. 7 and 8 imposes a nonuniform pulse, since the crush area and the crush resistance suddenly increase upon crushing of the central wedge 27 when the outer blunt wedges become engaged in the crush.

It is to be understood that various mitigator materials may be used in the present invention. However, it has been found that honeycombed or corrugated aluminum is especially advantageous in constructing mitigators according to the present invention.

Prior pure-mass MEM's and unshaped mitigators yielded sudden, irregular setback accelerations, and, therefore, relatively non-reproducible results. Actually, these prior systems produced such short rise times, in reaching maximum setback acceleration, that they would result in excessive experience for the components being tested — up to 100% overload.

The mitigator and the MEM of the present invention, however, make it possible to shape the pulse of setback acceleration to be imposed on the projectile and provide for an accuracy of plus or minus 10%.

While it is preferably to use an elastic MEM, it is to be understood that the mitigators of the present invention are suitable for use with pure-mass MEM's. Also, it is not necessary that the mitigator travel with the projectile, since the mitigator may be mounted on the stationary MEM for impact by the projectile.

From the foregoing, it is apparent that the present invention provides particularly improved form of ballistic simulation system, mitigator and MEM structure.

I wish it to be understood that I do not desire to be limited to the exact details of construction shown and described, for obvious modifications can be made by a person skilled in the art.

What is claimed is:

1. A ballistic simulation system for projectiles including:
    an accelerator for said projectiles;
    a momentum-exchange member including a resilient component positioned in the path of travel of said projectiles; and
    a crushable mitigator mounted on one of said porjectiles and said momentum-exchange member and positioned to be crushed therebetween, said mitigator including a cylindrical body and a non-cylindrical crush zone, said crush zone varying in cross-sectional area along its length and including plural areas for engagement by the other of said projectiles and said momentum-exchange member 2. A ballistic simulation system according to claim 1 in which said crush zone uniformly increases in cross-sectional area along its length.

3. A ballistic simulation system according to claim 1 in which said crush zone increasingly varies non-uniformly in cross-sectional area along its length.

4. A ballistic simulation system according to claim 1 in which said mitigator is formed of honeycombed aluminum.

5. A ballistic simulation system as set forth in claim 1 in which said pulse shaping means includes a resilient component in said momentum-exchange member.

6. A ballistic simulation system according to claim 1 in which said resilient component comprises a disc spring.

* * * * *